(12) United States Patent
Lee et al.

(10) Patent No.: US 12,107,684 B2
(45) Date of Patent: Oct. 1, 2024

(54) METHOD AND DEVICE FOR PERFORMING HARQ FEEDBACK IN WIRELESS COMMUNICATION SYSTEM

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 440 days.

(21) Appl. No.: 17/594,284

(22) PCT Filed: Apr. 10, 2020

(86) PCT No.: PCT/KR2020/004919
§ 371 (c)(1),
(2) Date: Oct. 8, 2021

(87) PCT Pub. No.: WO2020/209676
PCT Pub. Date: Oct. 15, 2020

(65) Prior Publication Data
US 2022/0166556 A1    May 26, 2022

Related U.S. Application Data

(60) Provisional application No. 62/916,777, filed on Oct. 17, 2019, provisional application No. 62/831,755, filed on Apr. 10, 2019.

(51) Int. Cl.
*H04L 1/1812* (2023.01)

(52) U.S. Cl.
CPC ............... *H04L 1/1812* (2013.01)

(58) Field of Classification Search
CPC ..................................... H04L 1/1812
See application file for complete search history.

(56) References Cited

U.S. PATENT DOCUMENTS

| 11,902,932 B2* | 2/2024 | Yoshioka ............ H04W 4/003 |
| 2008/0160912 A1 | 7/2008 | Kim et al. |
| 2022/0053496 A1* | 2/2022 | Yu ..................... H04L 1/1896 |

FOREIGN PATENT DOCUMENTS

| KR | 20150083108 | 7/2015 |
| WO | 2019004688 | 1/2019 |

OTHER PUBLICATIONS

PCT International Application No. PCT/KR2020/004919, International Search Report dated Jul. 20, 2020, 4 pages.
(Continued)

*Primary Examiner* — Chandrahas B Patel
(74) *Attorney, Agent, or Firm* — LEE, HONG, DEGERMAN, KANG & WAIMEY

(57) ABSTRACT

Proposed is a method for a first device to perform wireless communication. The method may include a step for: determining whether location information about the first device is valid; and transmitting information, pertaining to whether a hybrid automatic repeat request (HARQ) feedback based on the distance between terminals is disabled, to a second device through sidelink control information (SCI) on the basis of whether the location information about the first device is valid.

13 Claims, 22 Drawing Sheets

(56) References Cited

OTHER PUBLICATIONS

TCL Communication, "Physical Layer Procedures for Sidelink," R1-1904809, 3GPP TSG RAN WG1 Meeting #96B, Apr. 2019, 9 pages.
Fujitsu, "Efficient Sidelink CSI Feedback Mechanism for Groupcast NR-V2X," R1-1810592, 3GPP TSG-RAN WG1 Meeting #94Bis, Oct. 2018, 9 pages.

* cited by examiner (a)

(b)

(a)

(b)

FIG. 16 information related to whether or not HARQ feedback based on a distance between UEs is disabled from the first device through SCI ~S1610

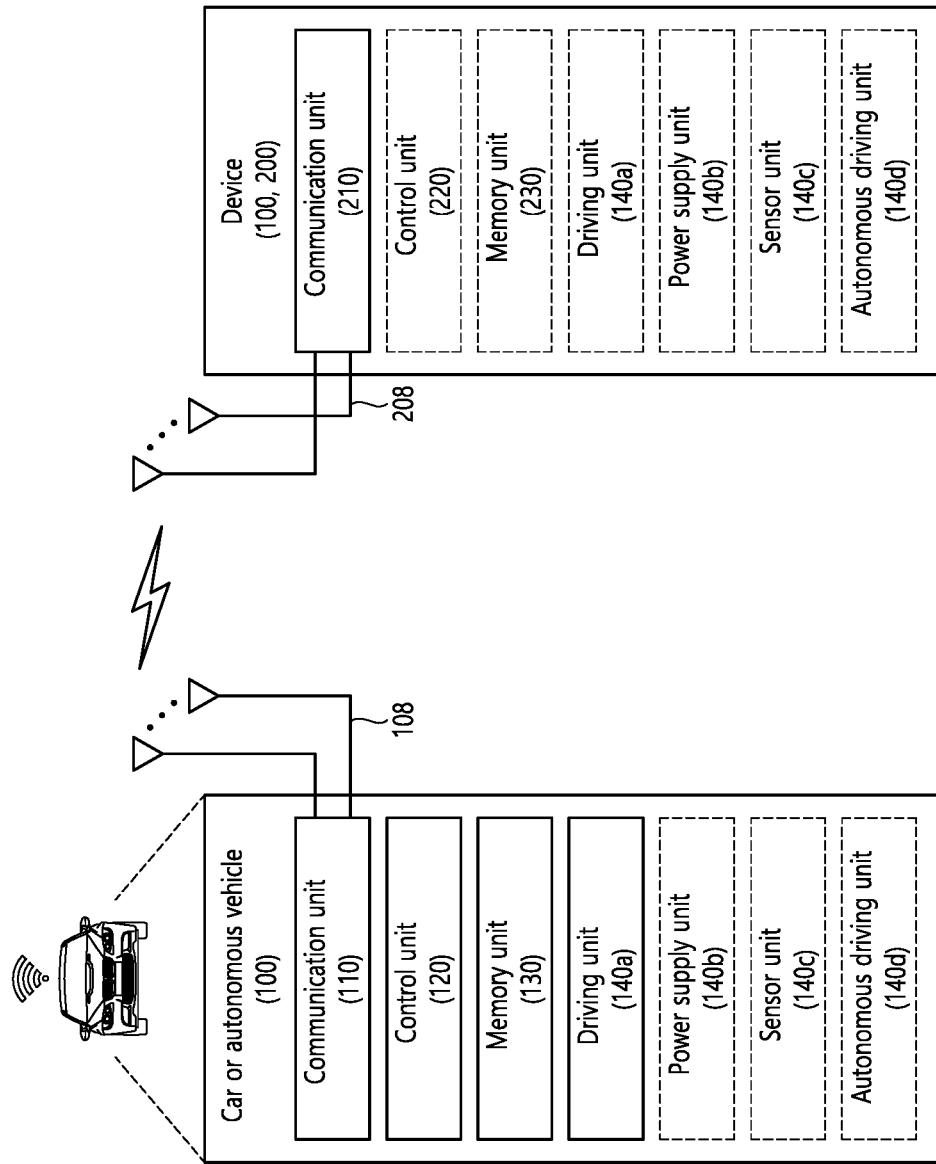

METHOD AND DEVICE FOR PERFORMING HARQ FEEDBACK IN WIRELESS COMMUNICATION SYSTEM

CROSS-REFERENCE TO RELATED APPLICATIONS

This application is the National Stage filing under 35 U.S.C. 371 of International Application No. PCT/KR2020/004919, filed on Apr. 10, 2020, which claims the benefit of U.S. Provisional Application No. 62/831,755, filed on Apr. 10, 2019, and 62/916,777, filed on Oct. 17, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, a distance-based hybrid automatic repeat request (HARQ) feedback may be enabled resource pool-specifically (and/or service-specific, and/or service requirement-specifically) by the base station/network. For example, when the distance-based HARQ feedback is enabled, due to an error or inaccuracy related to location information of a transmitting user equipment (UE), it may be difficult for the transmitting UE to receive the distance-based HARQ feedback from the receiving UE. Therefore, it is necessary for the transmitting UE to determine/determine an error or inaccuracy related to its own location information, and to adjust whether the transmitting UE performs the distance-based HARQ feedback based on the location information.

Technical Solutions

In an embodiment, there is provided a method of performing wireless communication by a first apparatus 100. The method may include determining whether location information of the first device is valid and based on whether the location information of the first device is valid, transmitting, to a second device, information related to whether or not hybrid automatic repeat request (HARQ) feedback based on a distance between UEs is disabled through sidelink control information (SCI).

EFFECTS OF THE DISCLOSURE

A UE may effectively perform sidelink communication.

BRIEF DESCRIPTION OF THE DRAWINGS

FIG. 16 shows a method for the second device 200 to receive information related to whether location information is valid from the first device 100, in accordance with an embodiment of the present disclosure.

FIG. 22 shows a car or an autonomous vehicle, in accordance with an embodiment of the present disclosure.

DESCRIPTION OF EXEMPLARY EMBODIMENTS

Figure 1:
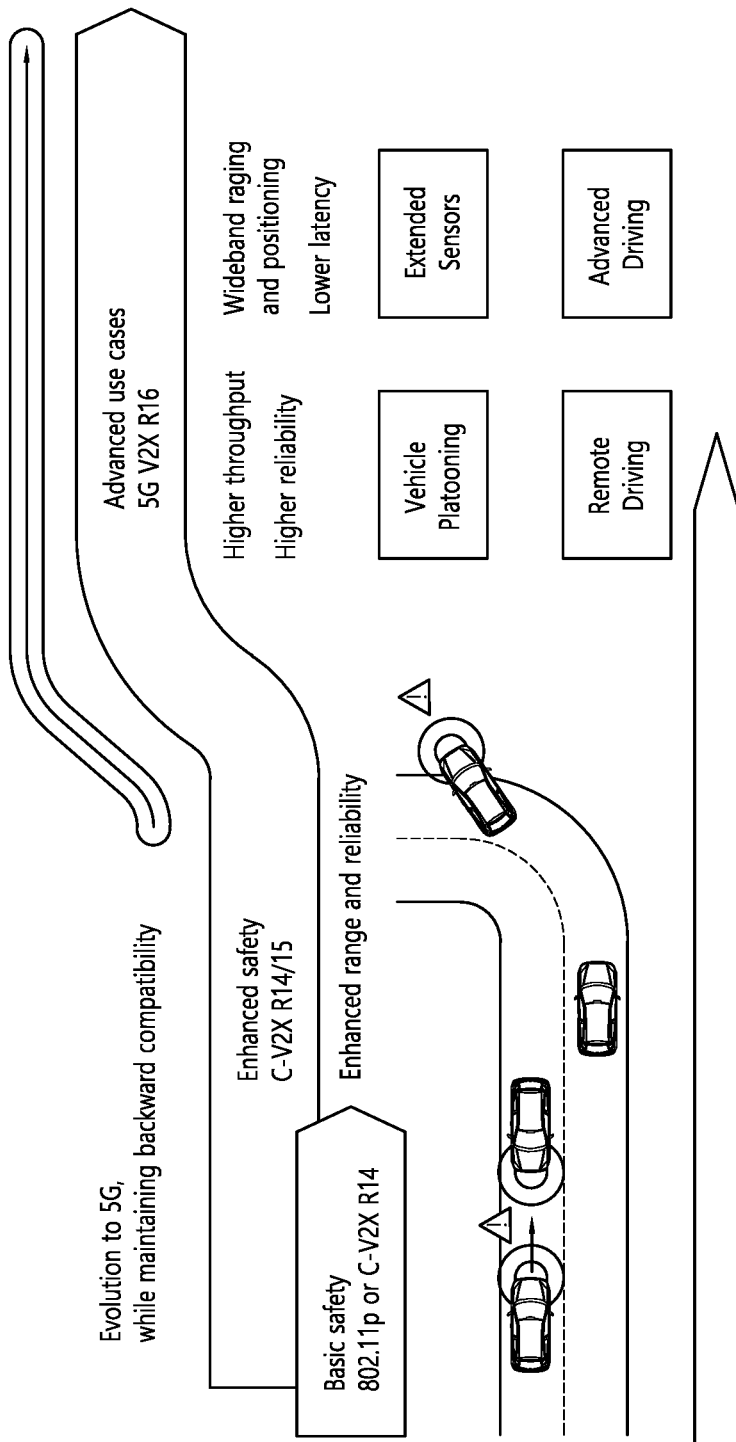
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE).

The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
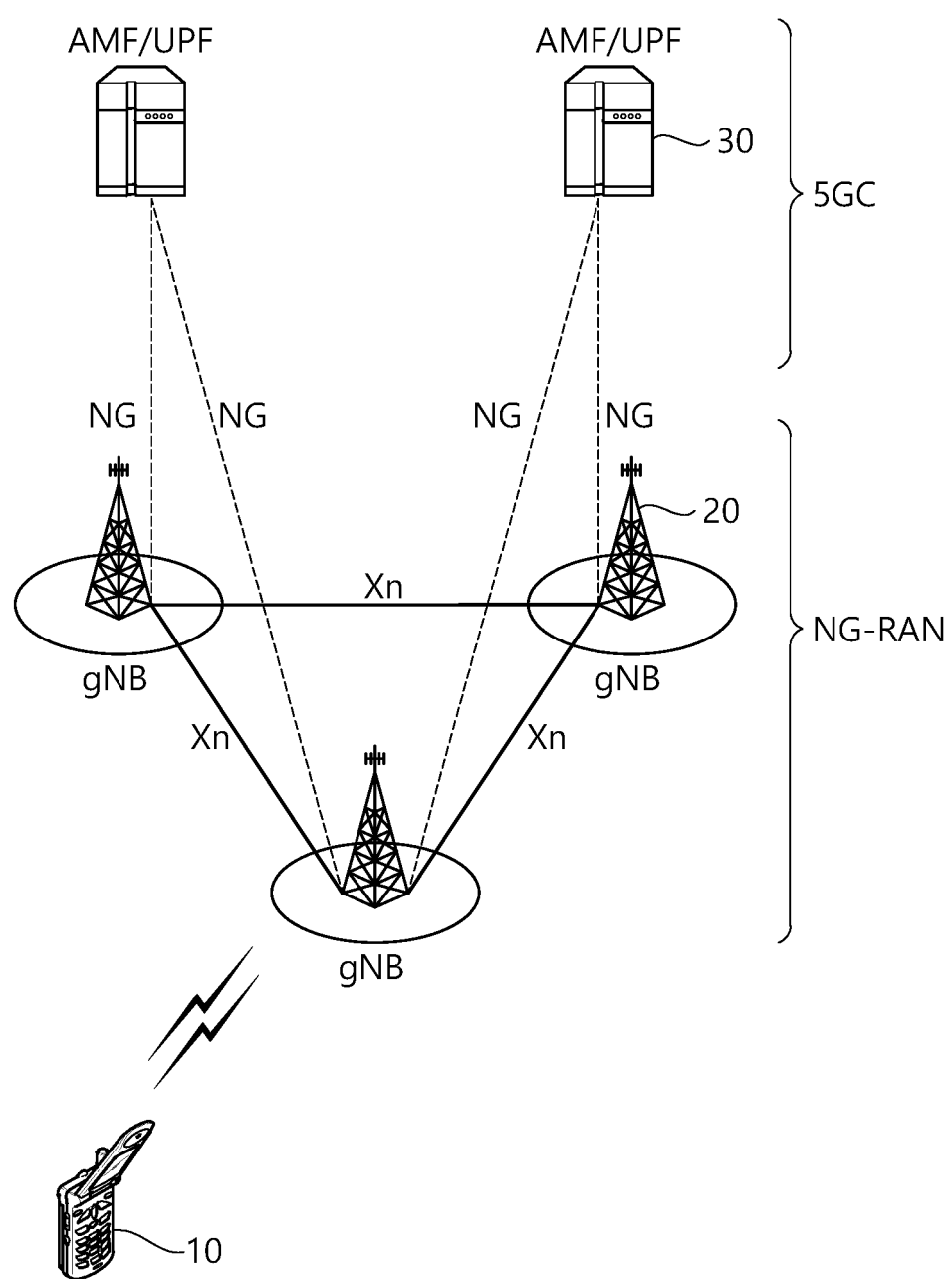
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
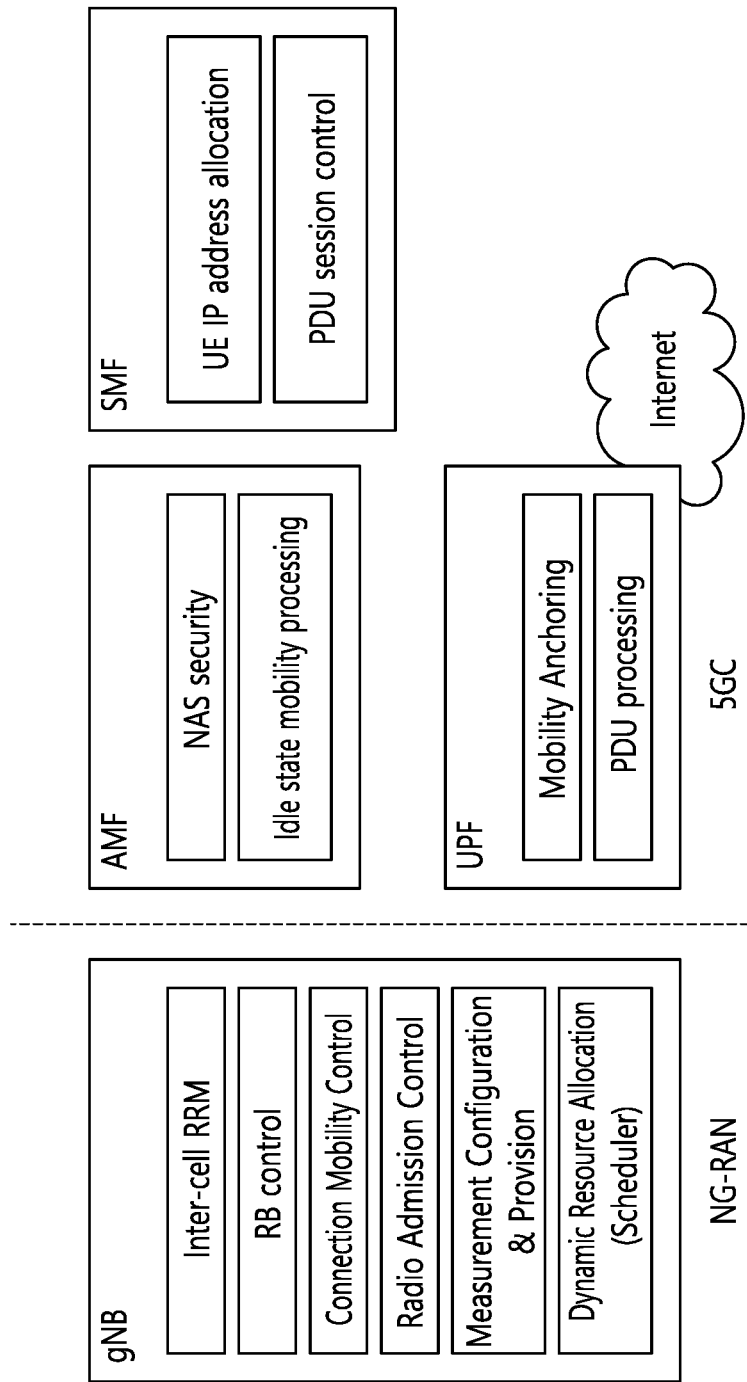
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
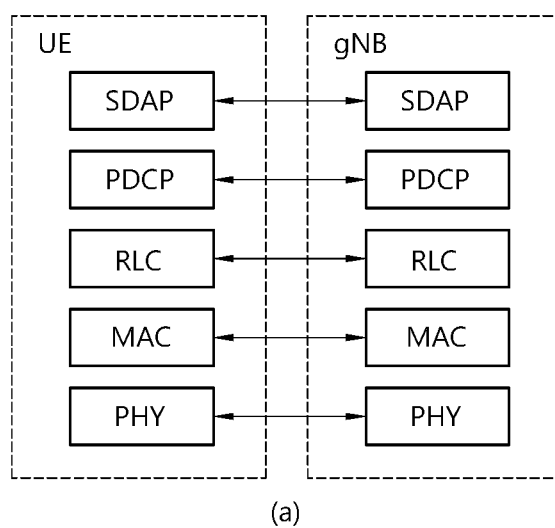
FIG. 4 shows a radio protocol architecture, in accordance with an embodiment of the present disclosure.
Figure 4:
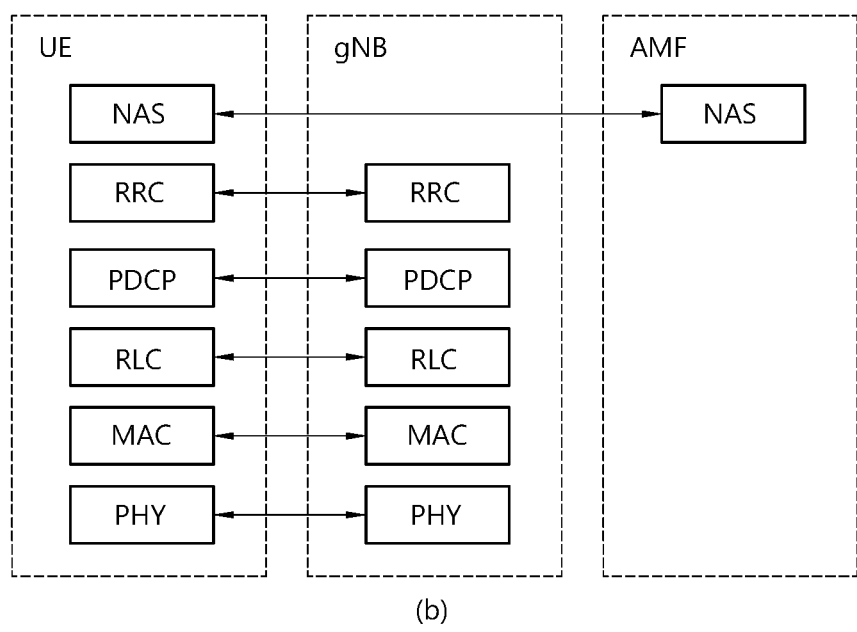

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
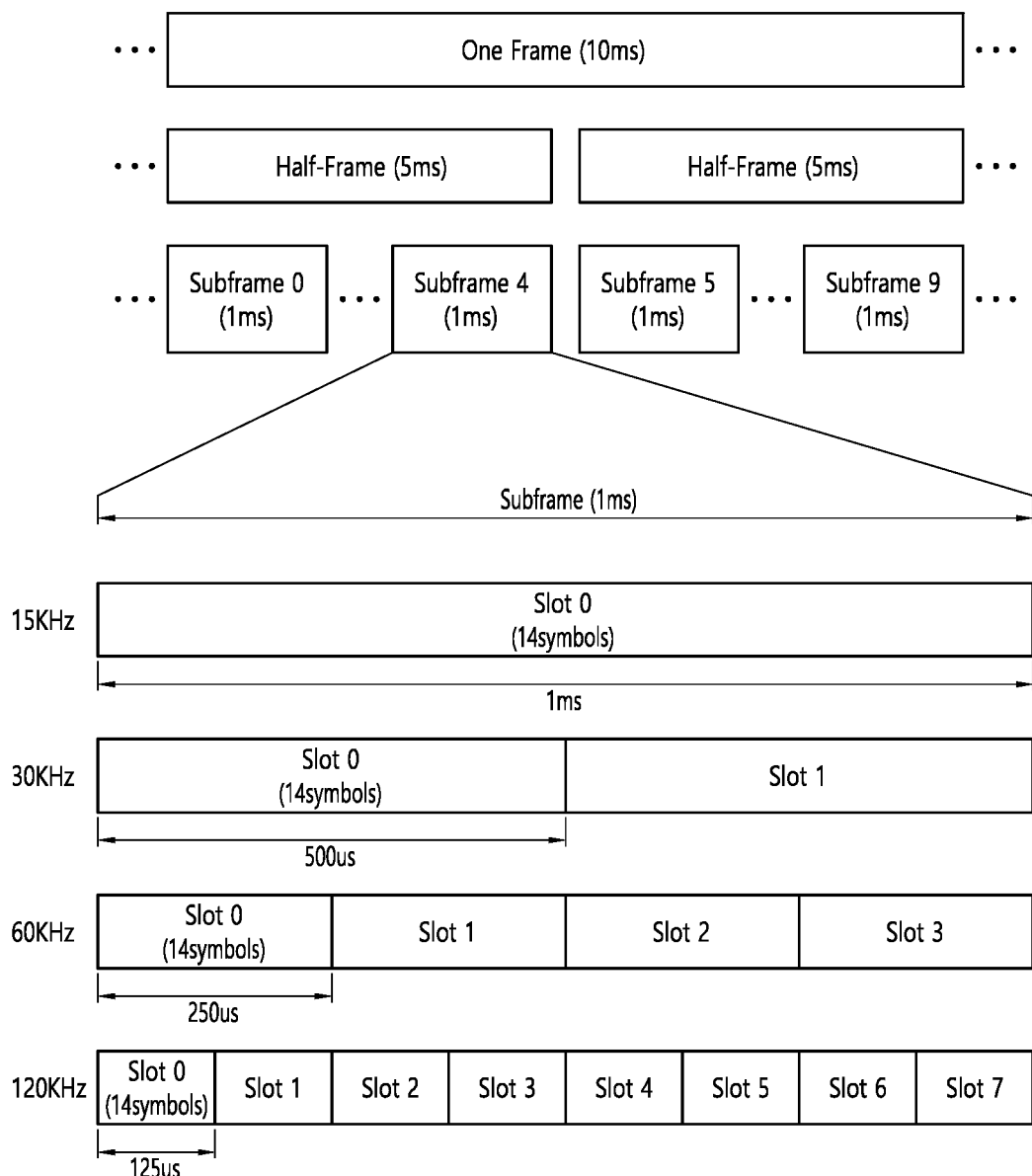
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$) and a number of slots per subframe ($N^{subframe,\mu}_{slot}$) based on an SCS configuration (u), in a case where a normal CP is used.

TABLE 1

| SCS (15 * 2u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * 2u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
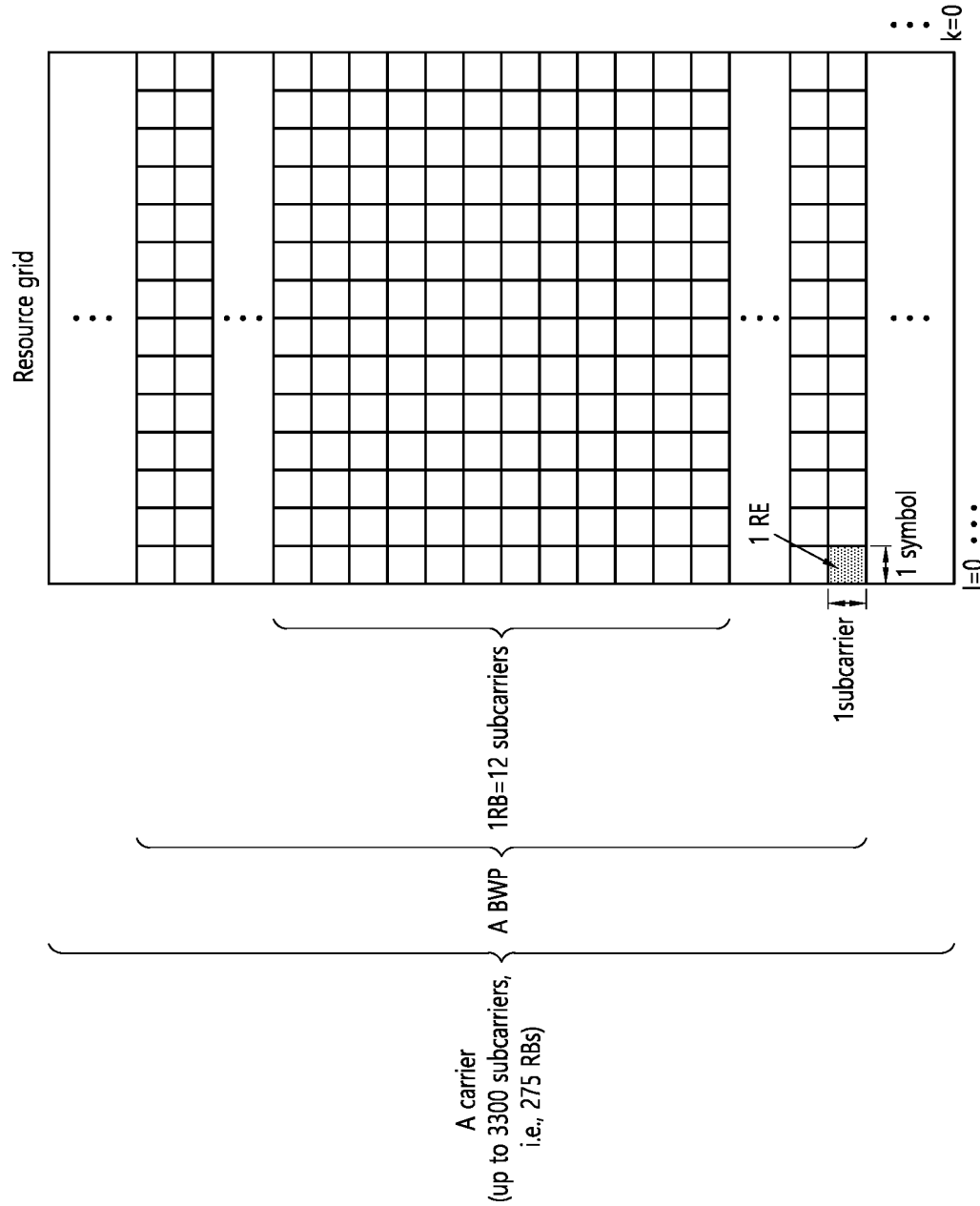
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
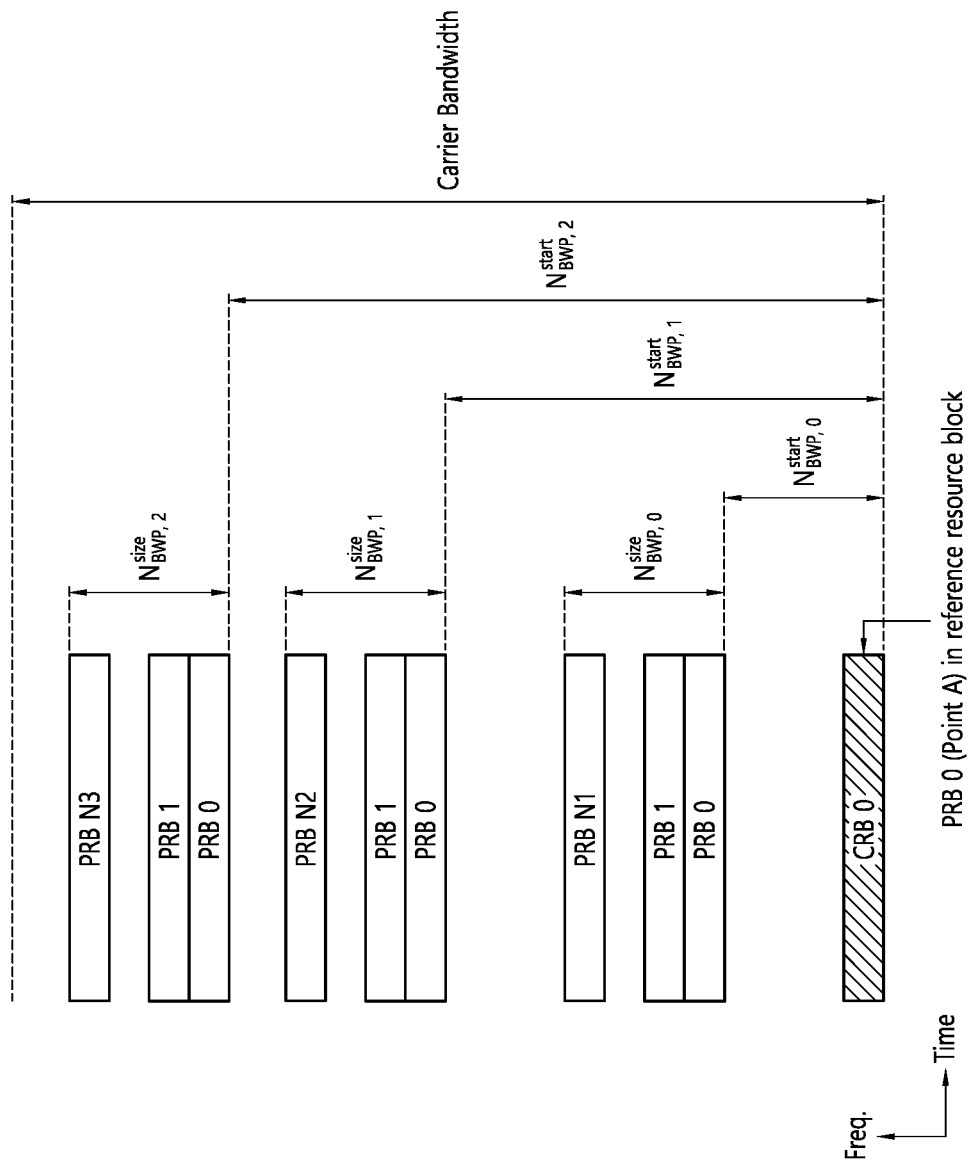
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
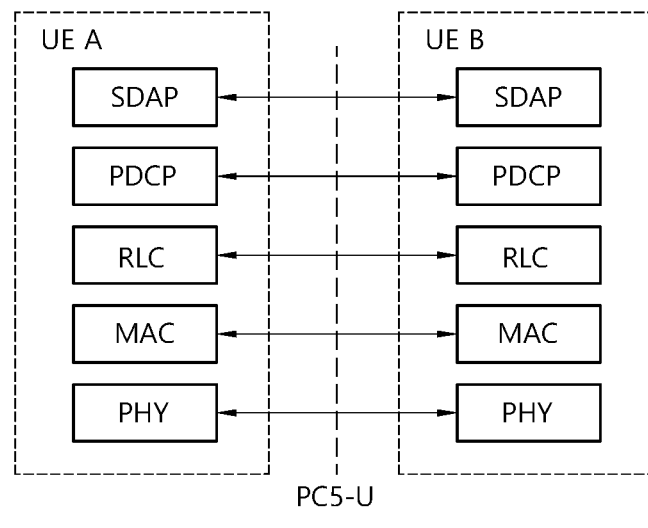
FIG. 8 shows a radio protocol architecture for a SL communication, in accordance with an embodiment of the present disclosure.
Figure 8:
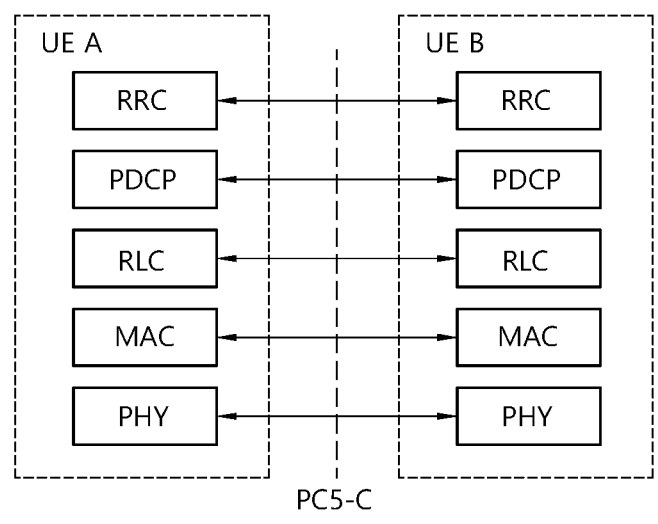

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
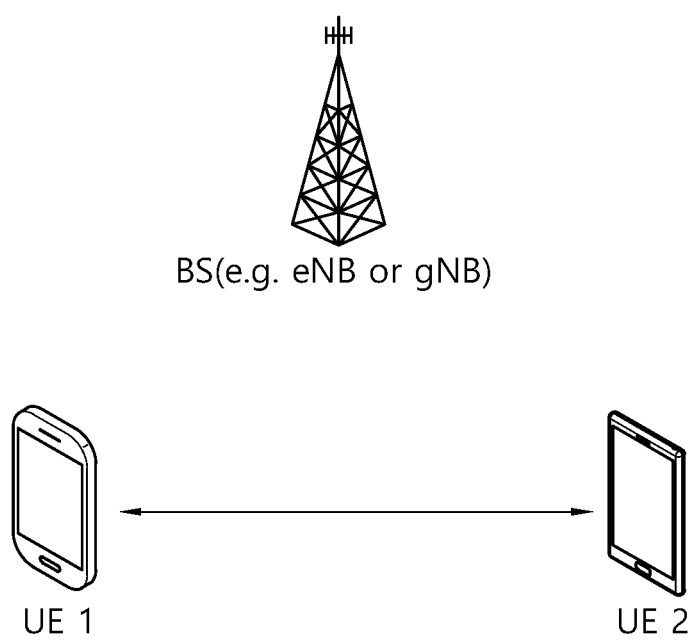
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
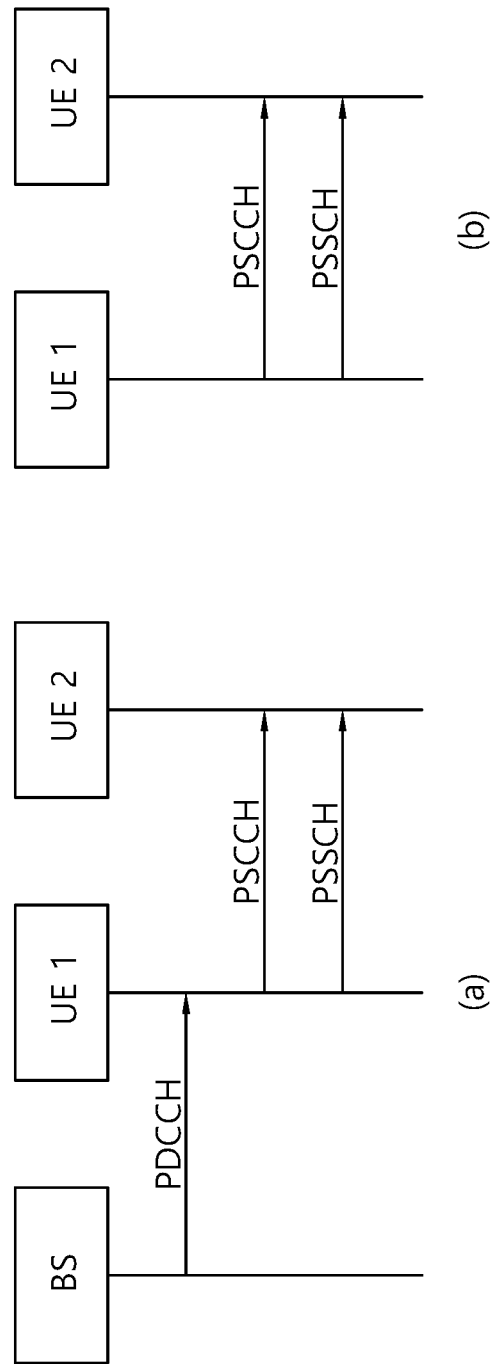
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource.

For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
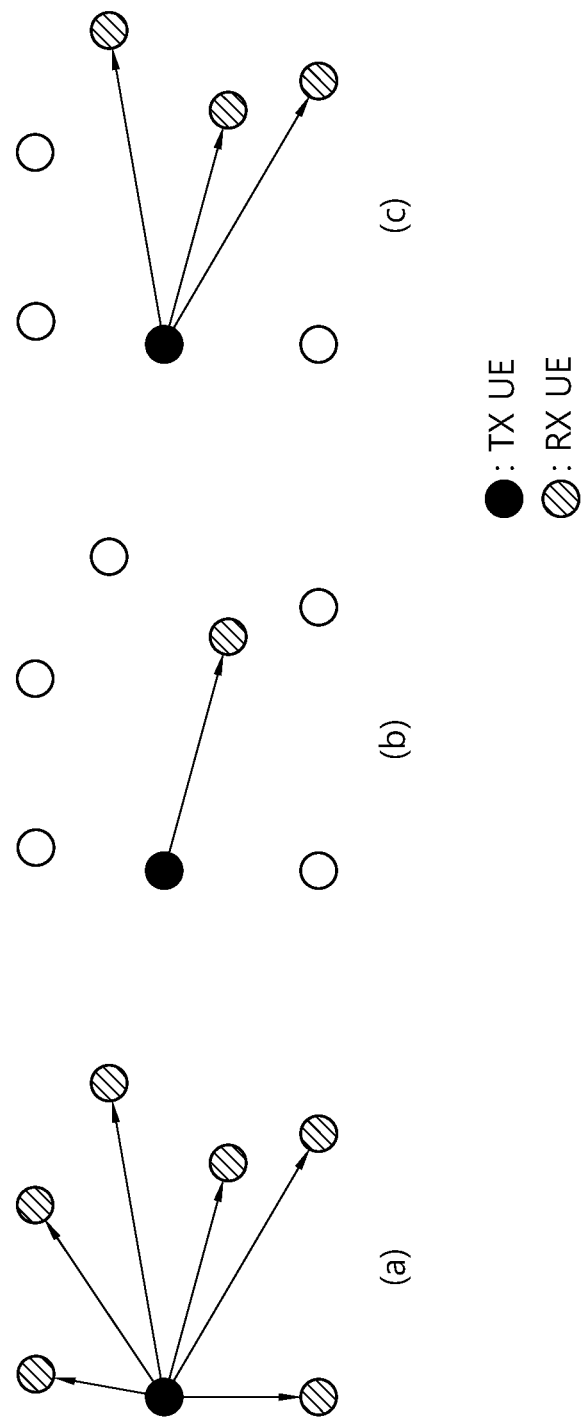
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

The SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, Sidelink Control Information (SCI) will be described.

Control information transmitted by a base station to a UE through a PDCCH may be referred to as downlink control information (DCI), whereas control information transmitted by the UE to another UE through a PSCCH may be referred to as SCI. For example, before the UE decodes a PSCCH, the UE may know the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as a first SCI or 1st SCI, and the SCI including a second SCI configuration field group may be referred to as a second SCI or 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through (independent) PSCCH or may be piggybacked and transmitted together with data through PSSCH. For example, two consecutive SCIs may be applied for different transmissions (e.g., unicast, broadcast, or groupcast).

For example, the first SCI may include information related to channel sensing. For example, the receiving UE may decode the second SCI using a PSSCH DMRS. A polar code used for the PDCCH may be applied to the second SCI. For example, in a resource pool, a payload size of the first SCI may be the same for unicast, groupcast and broadcast. After decoding the first SCI, the receiving UE does not need to perform blind decoding of the second SCI. For example, the first SCI may include scheduling information of the second SCI.

Meanwhile, in various embodiments of the present disclosure, since the transmitting UE may transmit at least one of the SCI, the first SCI and/or the second SCI to the receiving UE through the PSCCH, the PSCCH may be replaced/substituted with at least one of the SCI, the first SCI and/or the second SCI. And/or, for example, the SCI may be replaced/substituted with at least one of the PSCCH, the first SCI and/or the second SCI. And/or, for example, since the transmitting UE may transmit the second SCI to the receiving UE through the PSSCH, the PSSCH may be replaced/substituted with the second SCI.

In the present disclosure, the transmitting UE may be a UE transmitting sidelink information to the receiving UE, and the receiving UE may be a UE receiving sidelink information from the transmitting UE. For example, the sidelink information may include at least one of a sidelink message, a sidelink packet, a sidelink service, sidelink data, sidelink control information, and/or a sidelink transport block (TB).

Meanwhile, in the next communication system, in the case of groupcast, the receiving UE may efficiently determine whether to transmit a HARQ feedback (e.g., in the case of option 1 described above) using RSRP information and/or distance information (hereinafter, TR_DIS) between the transmitting UE and the receiving UE. For example, the distance information between the transmitting UE and the receiving UE may include physical distance information between the transmitting UE and the receiving UE. For example, RSRP information may include RSRP information related to sidelink information. For example, the RSRP information may include RSRP information measured based on a pre-configured measurement reference signal (e.g., CSI-RS, PSCCH DM-RS, PSSH DM-RS) received by the receiving UE from the transmitting UE. For example, the RSRP information may include L1 RSRP information and/or L3 RSRP information.

Figure 12:
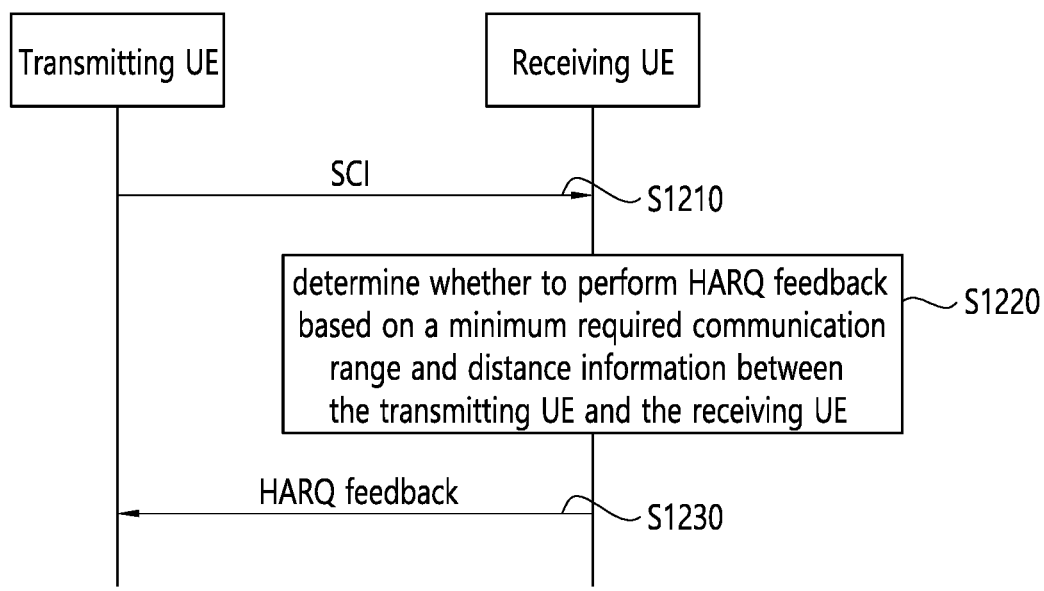
FIG. 12 shows a procedure for a receiving UE to perform HARQ feedback, in accordance with an embodiment of the present disclosure.

FIG. 12 shows a procedure for a receiving UE to perform HARQ feedback, in accordance with an embodiment of the present disclosure. The embodiment of FIG. 12 may be combined with various embodiments of the present disclosure.

Referring to FIG. 12, in step S1210, the transmitting UE may transmit sidelink control information (SCI) to the receiving UE. For example, the SCI may include location information of the transmitting UE, location or distance area information of the target receiving UE and/or reference signal (e.g., DMRS, etc.) information related to decoding and/or channel estimation of data transmitted through the PSSCH, information related to a pattern of time-frequency mapping resource of DMRS, rank information, antenna port index information, information related to a communication range requirement, information related to a format for the second SCI, and the like. For example, the transmitting UE may transmit the SCI to the receiving UE through the PSCCH/PSSCH. For example, the transmitting UE may transmit information related TR_DIS and to a minimum required communication range to the receiving UE through SCI.

In step S1220, the receiving UE may determine whether to perform HARQ feedback based on a minimum required communication range and TR_DIS. In step S1230, the receiving UE may transmit the HARQ feedback to the transmitting UE. For example, when the TR_DIS is less than or equal to the minimum required communication range required by the QoS parameter related to the sidelink data received by the receiving UE from the transmitting UE, the receiving UE may transmit the HARQ feedback to the transmitting UE.

Alternatively, for example, when a RSRP value measured by the receiving UE is less than or equal to a target RSRP value of the receiving UE, the receiving UE may transmit the HARQ feedback to the transmitting UE. For example, when a RSRP value related to the sidelink communication with the transmitting UE measured by the receiving UE is less than or equal to a minimum target RSRP value of the receiving UE, the receiving UE may transmit the HARQ feedback to the transmitting UE. For example, when a RSRP value related to the sidelink communication with the transmitting UE measured by the receiving UE is less than or equal to a maximum target RSRP value of the receiving UE, the receiving UE may transmit the HARQ feedback to the transmitting UE.

For example, a linkage/mapping between the target RSRP and the minimum required communication range may be pre-configured. For example, a linkage/mapping between the maximum target RSRP and the minimum required communication range related to a specific service may be pre-configured. For example, a linkage/mapping between the minimum target RSRP and the minimum required communication range related to a specific service may be pre-configured. Alternatively, for example, information related to the linkage/mapping may be configured by the base station/network for the UE through pre-defined signaling.

Figure 13:
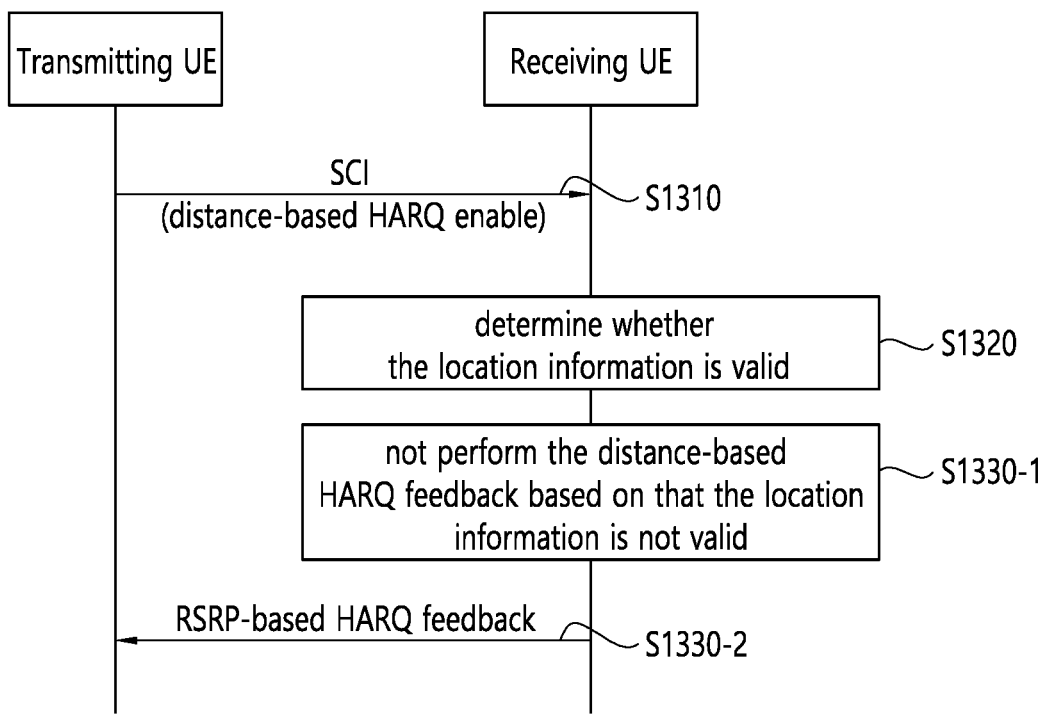
FIG. 13 shows a procedure for a receiving UE to determine whether to perform HARQ feedback based on location information, in accordance with an embodiment of the present disclosure.

For example, when the distance-based (e.g., TR_DIS-based) HARQ feedback transmission operation and the RSRP-based HARQ feedback transmission operation are enabled, various embodiments of the present disclosure may be applied. And/or, when the TR_DIS-based HARQ feedback transmission operation is only enabled, various embodiments of the present disclosure may be applied. And/or, when the RSRP-based HARQ feedback transmission operation is only enabled, various embodiments of the present disclosure may be applied FIG. 13 shows a procedure for a receiving UE to determine whether to perform HARQ feedback based on location information, in accordance with an embodiment of the present disclosure. The embodiment of FIG. 13 may be combined with various embodiments of the present disclosure.

Referring to FIG. 13, in step S1310, a transmitting UE may transmit a SCI to a receiving UE. For example, the transmitting UE may enable a field related to distance-based HARQ feedback on the SCI and transmit the SCI to the receiving UE. For example, if the location information of the transmitting UE is valid, the transmitting UE may enable the field related to distance-based HARQ feedback on the SCI. For example, the transmitting UE may transmit the SCI to the receiving UE through a PSCCH/PSSCH. For example, the SCI may include information related to whether the location information of the transmitting UE is valid. For example, whether the location information of the transmitting UE is valid may include whether the location information is available.

In step S1320, the receiving UE may determine whether the location information is valid. For example, the receiving UE may determine whether the location information of the receiving UE is valid. For example, the receiving UE may determine whether the location information is valid based on whether the accuracy related to the location information of the receiving UE and/or TR_DIS satisfies a pre-configured threshold value. For example, when the receiving UE determines that the location information is valid, the receiving UE may perform distance-based (e.g., TR_DIS-based) HARQ feedback. For example, when the accuracy related to the location information of the receiving UE and/or TR_DIS satisfies the pre-configured threshold value, the receiving UE may perform distance-based (e.g., TR_DIS-based) HARQ feedback. For example, when the receiving UE detects a synchronization source (e.g., GNSS) having a synchronization quality greater than a pre-configured synchronization quality threshold, the receiving UE may determine that the location information of the receiving UE is valid. For example, when the receiving UE detects synchronization sources (e.g., GNSS) having a synchronization quality greater than a pre-configured synchronization quality threshold, if the number of the detected synchronization sources is greater than a pre-configured number, the receiving UE may determine that the location information of the receiving UE is valid.

In step S1330-1, the receiving UE may not perform the distance-based HARQ feedback to the transmitting UE based on that the location information is not valid. In step S1330-2, the receiving UE may transmit the RSRP-based HARQ feedback to the transmitting UE based on that the location information is not valid. For example, when the accuracy related to the location information of the receiving UE and/or TR_DIS does not satisfy the pre-configured threshold value, the receiving UE may not perform (distance-based (e.g., TR_DIS-based)) HARQ feedback. For example, the above-described rule application, when the receiving UE has its own location information is not valid, distance-based HARQ feedback may be interpreted as implicitly disabled, and/or HARQ feedback performance may be interpreted as implicitly stopped. For example, although the receiving UE receives the SCI in which a field related to distance-based HARQ feedback is enabled from the transmitting UE, if the accuracy related to the location information of the receiving UE and/or TR_DIS does not satisfy the pre-configured threshold, the receiving UE may not perform distance-based (e.g., TR_DIS-based) HARQ feedback. For example, when the accuracy related to the location information of the receiving UE and/or TR_DIS does not satisfy the pre-configured threshold value, the receiving UE may perform RSRP-based HARQ feedback without performing distance-based HARQ feedback. As an example, the above-described rule application, when the receiving UE has its own location information is not valid, although the receiving UE does not perform distance-based HARQ feedback to the transmitting UE (e.g., it may be interpreted as assuming that the distance-based HARQ feedback is implicitly disabled by the receiving UE), it may be interpreted as performing (not distance-based) HARQ feedback based on another scheme (and/or information) pre-configured/defined. In other words, for example, when HARQ enabled MAC PDU (or TB) is received (and/or when the PSCCH/PSSCH indicated as ENABLED in a HARQ feedback request field on the SCI is received), (from the viewpoint of the receiving UE) it may be interpreted that the HARQ feedback operation is still maintained. For example, when the receiving UE detects a synchronization source (e.g., GNSS) having a synchronization quality less than a pre-configured synchronization quality threshold, the receiving UE may determine that the location information of the receiving UE is invalid. For example, when the receiving UE detects synchronization sources (e.g., GNSS) having a synchronization quality greater than a pre-configured synchronization quality threshold, if the number of detected synchronization sources is less than a pre-configured number, the receiving UE may determine that the location information of the receiving UE is invalid.

For example, any one of the above-described steps S1330-1 and S1330-2 may be omitted.

According to an embodiment of the present disclosure, if the accuracy related to the location information of the receiving UE and/or TR_DIS does not satisfy a pre-configured threshold, the receiving UE may determine whether to transmit RSRP-based HARQ feedback. For example, the receiving UE may determine whether to transmit the RSRP-based HARQ feedback as a fallback operation. In addition, for example, when the accuracy related to the location information of the receiving UE and/or TR_DIS satisfies a pre-configured threshold value (and/or according to whether or not satisfies the pre-configured threshold value), the receiving UE may determine whether to transmit TR_DIS-based HARQ feedback and/or whether to transmit RSRP-based HARQ feedback. For example, if the rule applies, when the accuracy related to the location information of the receiving UE and/or TR_DIS satisfies a pre-configured threshold, the receiving UE performs TR_DIS-based HARQ feedback transmission to the transmitting UE, Otherwise, the receiving UE may not perform HARQ feedback (based on TR_DIS) to the transmitting UE (and/or pre-configured/defined schemes (and/or information)-based HARQ feedback may be performed). For example, when the receiving UE uses both TR_DIS-based HARQ feedback and RSRP-based HARQ feedback, if conditions related to both HARQ feedbacks are satisfied, the receiving UE may transmit HARQ feedback to the transmitting UE.

According to an embodiment of the present disclosure, it may be the following case that the accuracy related to location information and/or TR_DSI does not satisfy a pre-configured threshold value. For example, it may mean a case in which the UE fails to detect a GNSS that satisfies a pre-configured synchronization quality threshold. And/or, for example, since the UE fails to detect a GNSS that satisfies a pre-configured synchronization quality threshold, it may mean a case in which the UE does not derive GNSS-based time/frequency synchronization or cannot synchronize. And/or, for example, it may be a case in which the UE fails to detect a pre-configured number (for example, three) of GNSS necessary to derive TR_DIS and/or location information that satisfy a pre-configured accuracy threshold. Alternatively, for example, it may be a case in which the UE fails to secure the location information of the UE and/or TR/DIS that satisfies a pre-configured threshold value through a specific predefined mechanism (e.g., a mechanism for a synchronization source other than GNSS).

Figure 14:
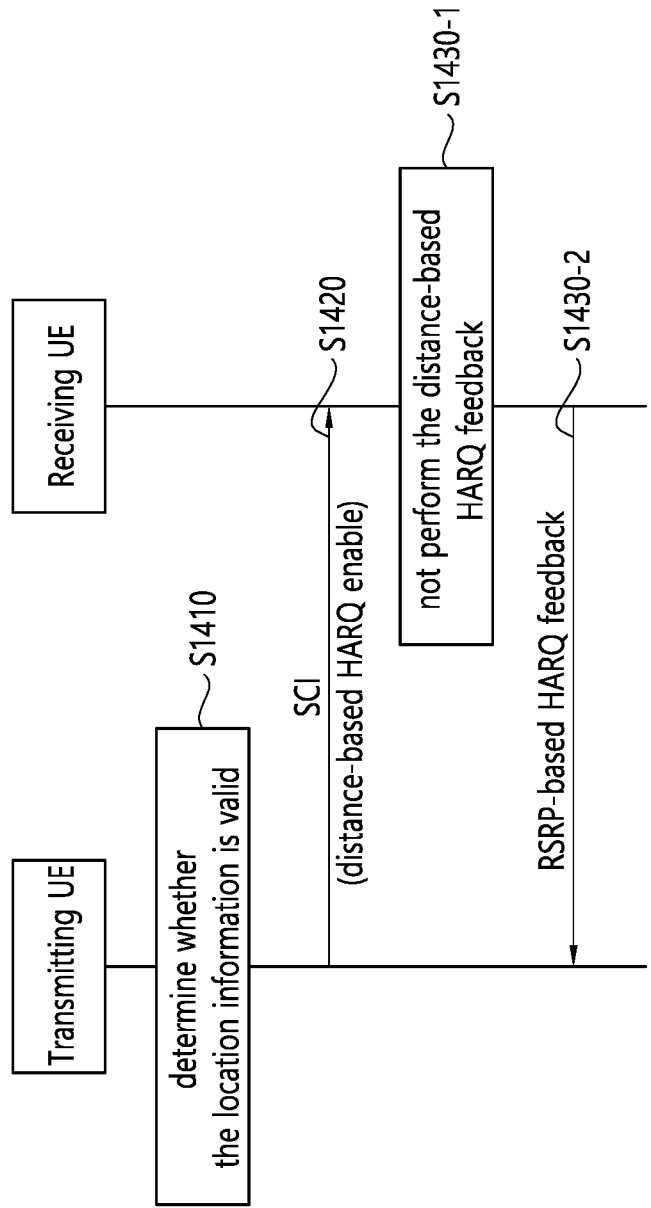
FIG. 14 shows a procedure for a transmitting UE to determine whether to perform HARQ feedback based on location information, in accordance with an embodiment of the present disclosure.

FIG. 14 shows a procedure for a transmitting UE to determine whether to perform HARQ feedback based on location information, in accordance with an embodiment of the present disclosure. The embodiment of FIG. 14 may be combined with various embodiments of the present disclosure.

Referring to FIG. 14, in step S1410, the transmitting UE may determine whether location information is valid. For example, the transmitting UE may determine whether the location information of the transmitting UE is valid. For example, the transmitting UE may determine whether the location information is valid based on whether the accuracy related to the location information of the transmitting UE and/or TR_DIS satisfies a pre-configured threshold value. For example, when the transmitting UE detects a synchronization source (e.g., GNSS) having a synchronization quality greater than a pre-configured synchronization quality threshold, the transmitting UE may determine that the location information of the transmitting UE is valid. For example, whether the location information of the transmitting UE is valid may include whether the location information is available. For example, when the transmitting UE detects synchronization sources (e.g., GNSS) having a synchronization quality greater than a pre-configured synchronization quality threshold, if the number of the detected synchronization sources is greater than a pre-configured number, the transmitting UE may determine that the location information of the transmitting UE is valid. For example, when the transmitting UE detects a synchronization source (e.g., GNSS) with a synchronization quality less than a pre-configured synchronization quality threshold, the transmitting UE may determine that the location information of the transmitting UE is invalid. For example, when the transmitting UE detects synchronization sources (e.g., GNSS) having a synchronization quality greater than a pre-configured synchronization quality threshold, if the number of detected synchronization sources is less than a pre-configured number, the transmitting UE may determine that the location information of the transmitting UE is invalid.

For example, if the location information of the transmitting UE is valid, the transmitting UE may enable a field related to distance-based HARQ feedback on SCI. For example, if the location information of the transmitting UE is not valid, the transmitting UE may disable a field related to (distance-based) HARQ feedback on SCI. That is, for example, it can be interpreted as assuming that the transmitting UE implicitly disallows the (distance-based) HARQ feedback operation (and/or request). For example, when applying the rules described above, if the location information of the transmitting UE is not valid, (distance-based) not HARQ feedback operation, it can be interpreted as performing SL communication in another (pre-configured) scheme (e.g., NACK ONLY HARQ feedback operation (not using distance information), blind retransmission operation, etc.).

In step S1420, the transmitting UE may transmit the SCI to the receiving UE. For example, the transmitting UE may enable a field related to distance-based HARQ feedback on the SCI, and the transmitting UE may transmit the SCI to the receiving UE. For example, if the location information of the transmitting UE is valid, the transmitting UE may enable a field related to distance-based HARQ feedback on the SCI. For example, the transmitting UE may disable a field related to (distance-based) HARQ feedback on the SCI, and the transmitting UE may transmit the SCI to the receiving UE. For example, if the location information of the transmitting UE is not valid, the transmitting UE may disable a field related to (distance-based) HARQ feedback on the SCI (and/or stop the (distance-based) HARQ feedback request operation and/or perform a blind retransmission operation). For example, the transmitting UE may transmit the SCI to the receiving UE through the PSCCH/PSSCH. For example, the SCI may include information related to whether the location information of the transmitting UE is valid. For example, as described above, whether the location information of the transmitting UE is valid may be determined based on a case in which the accuracy related to the location information of the transmitting UE does not satisfy a pre-configured threshold value.

According to an embodiment of the present disclosure, when the accuracy related to the location information of the transmitting UE does not satisfy a pre-configured threshold value, the transmitting UE may set a field related to the location information of the transmitting UE on the SCI to a pre-defined value (e.g., a value related to the location of a specific transmitting UE (and/or a specific location of the transmitting UE) (defined for that purpose), a specific bit value), and the transmitting UE may transmit the SCI to the receiving UE. For example, when the accuracy related to the location information of the transmitting UE does not satisfy a pre-configured threshold value, the transmitting UE may transmit the SCI to the receiving UE by setting the ZONE identifier field on the SCI to a pre-defined value (e.g., a specific ZONE ID value, a specific bit value). For example, when the accuracy related to the location information of the transmitting UE does not satisfy a pre-configured threshold value, the transmitting UE may transmit the SCI to the receiving UE by setting a pre-configured field (e.g., the minimum required communication range field) on the SCI to a pre-defined bit value. For example, the rules described above can be interpreted as signaling that the transmitting UE is in an invalid state of its location information to the receiving UE, by designating a (pre-configured/defined) (specific) field existing on the SCI as a pre-configured specific value. Herein, for example, it may be interpreted that the receiving UE receiving the SCI does not transmit (distance-based) HARQ feedback to the transmitting UE (for example, the receiving terminal may assume that the (distance-based) HARQ feedback is implicitly disabled (and/or that the transmitting terminal performs blind retransmission)), and/or performs HARQ feedback based on another scheme (and/or information) pre-configured/defined. In the latter case, for example, when HARQ enabled MAC PDU (or TB) is received (and/or when the PSCCH/PSSCH indicated by ENABLED in the HARQ feedback request field on SCI is received), (from the viewpoint of the receiving terminal) it may be interpreted that the HARQ feedback operation is still maintained.

Alternatively, for example, when the accuracy related to the location information of the transmitting UE does not satisfy the pre-configured threshold, the transmitting UE may remove a field related to the location information of the transmitting UE on the SCI and transmit the SCI to the receiving UE. For example, when the accuracy related to the location information of the transmitting UE does not satisfy a pre-configured threshold value, the transmitting UE may remove a ZONE identifier field on the SCI and transmit the SCI to the receiving UE. For example, when the accuracy related to the location information of the transmitting UE does not satisfy a pre-configured threshold value, the transmitting UE may remove a pre-configured field (e.g., a minimum required communication range field) on the SCI and transmit the SCI to the receiving UE.

Alternatively, for example, when the field (and/or the ZONE identifier field and/or the pre-configured field (e.g., the minimum required communication range field)) related to the location information of the transmitting UE is transmitted through the 2nd SCI, the transmitting UE may transmit information on whether the field (and/or the ZONE identifier field and/or the pre-configured field (e.g., the minimum required communication range field)) related to the location information of the transmitting UE exists on the 2nd SCI on the 1st SCI. For example, when the accuracy related to the location information of the transmitting UE does not satisfy a pre-configured threshold value, the transmitting terminal may transmit information indicating that a field related to the location information of the transmitting UE (and/or the ZONE identifier field and/or the pre-configured field (e.g., the minimum required communication range field)) does not exist on the 2nd SCI on the 1st SCI to the receiving UE. Through this, the transmitting UE may implicitly inform the receiving UE that the distance-based HARQ feedback is disabled (and/or the transmitting UE performs blind retransmission (and/or does not request HARQ feedback) and/or performs/requests HARQ feedback based on another scheme (and/or information) pre-configured/defined and/or own location information is invalid). And/or, when a format of the 2nd SCI is changed according to whether a field related to the location information of the transmitting UE (and/or the ZONE identifier field and/or the pre-configured field (e.g., the minimum required communication range field)) is included in the 2nd SCI, the transmitting UE may transmit 2nd SCI format information on 1st SCI. For example, when the accuracy related to the location information of the transmitting UE does not satisfy a pre-configured threshold value, the transmitting UE may transmit 2nd SCI format information that does not include a field related to distance-based HARQ feedback (and/or the field related to the location information of the transmitting UE and/or the ZONE identifier field and/or the pre-configured field (e.g., the minimum required communication range field)) on the 1st SCI to the receiving UE. Through this, the transmitting UE may implicitly inform the receiving UE that the distance-based HARQ feedback is disabled (and/or the transmitting UE performs blind retransmission (and/or does not request HARQ feedback) and/or performs/requests HARQ feedback based on another scheme (and/or information) pre-configured/defined and/or own location information is invalid). for example, it may be interpreted that the receiving UE receiving the SCI does not transmit (distance-based) HARQ feedback to the transmitting UE (for example, the receiving terminal may assume that the (distance-based) HARQ feedback is implicitly disabled (and/or that the transmitting terminal performs blind retransmission)), and/or performs HARQ feedback based on another scheme (and/or information) pre-configured/defined. In the latter case, for example, when HARQ enabled MAC PDU (or TB) is received (and/or when the PSCCH/PSSCH indicated by ENABLED in the HARQ feedback request field on SCI is received), (from the viewpoint of the receiving terminal) it may be interpreted that the HARQ feedback operation is still maintained.

In step S1430-1, the receiving UE may not perform distance-based HARQ feedback to the transmitting UE. For example, the receiving UE may not perform distance-based HARQ feedback to the transmitting UE based on the received SCI. For example, the receiving UE may not perform distance-based HARQ feedback to the transmitting UE based on that a field related to the distance-based HARQ feedback on the received SCI is disabled.

For example, the receiving UE may not perform distance-based HARQ feedback to the transmitting UE based on a pre-defined value of a field related to the location information of the transmitting UE (e.g., a value related to the location of the transmitting UE) on the received SCI. For example, the receiving UE may not perform distance-based HARQ feedback to the transmitting UE based on a pre-defined value (e.g., a specific ZONE ID value) of the ZONE identifier field on the received SCI. For example, the receiving UE may not perform distance-based HARQ feedback to the transmitting UE based on a pre-defined bit value of a pre-configured field on the received SCI.

For example, the receiving UE may not perform distance-based HARQ feedback to the transmitting UE based on that a field related to the location information of the transmitting UE does not exist on the received SCI. For example, the receiving UE may not perform distance-based HARQ feedback to the transmitting UE based on the absence of the ZONE identifier field on the received SCI. For example, the receiving UE may not perform distance-based HARQ feedback to the transmitting UE based on the absence of a pre-configured field on the received SCI.

For example, the receiving UE may not perform distance-based HARQ feedback to the transmitting UE based on information that a field related to the location information of the transmitting UE does not exist on the 2nd SCI on the received 1st SCI. For example, the receiving UE may not perform distance-based HARQ feedback to the transmitting UE based on 2nd SCI format information on the received 1st SCI. For example, the 2nd SCI format may be a format that does not include a field related to distance-based HARQ feedback.

In step S1430-2, the receiving UE may transmit RSRP-based HARQ feedback to the transmitting UE. For example, the receiving UE may transmit RSRP-based HARQ feedback to the transmitting UE based on the received SCI. For example, the receiving UE may transmit RSRP-based HARQ feedback to the transmitting UE based on that a field related to distance-based HARQ feedback on the received SCI is disabled.

For example, the receiving UE may transmit RSRP-based HARQ feedback to the transmitting UE based on a pre-defined value (e.g., a value related to the location of the transmitting UE) of a field related to the location information of the transmitting UE on the received SCI. For example, the receiving UE may transmit RSRP-based HARQ feedback to the transmitting UE based on a pre-defined value (e.g., a specific ZONE ID value) of a ZONE identifier field on the received SCI. For example, the receiving UE may transmit RSRP-based HARQ feedback to the transmitting UE based on a pre-defined bit value of a pre-configured field on the received SCI.

For example, the receiving UE may transmit RSRP-based HARQ feedback to the transmitting UE based on that the field related to the location information of the transmitting UE does not exist on the received SCI. For example, the receiving UE may transmit RSRP-based HARQ feedback to the transmitting UE based on the absence of the ZONE identifier field on the received SCI. For example, the receiving UE may transmit RSRP-based HARQ feedback to the transmitting UE based on the absence of the pre-configured field on the received SCI.

For example, the receiving UE may transmit RSRP-based HARQ feedback to the transmitting UE based on information that a field related to the location information of the transmitting UE does not exist on the 2nd SCI on the received 1st SCI. For example, the receiving UE may transmit RSRP-based HARQ feedback to the transmitting UE based on 2nd SCI format information on the received 1st SCI. For example, the 2nd SCI format may be a format that does not include a field related to distance-based HARQ feedback.

For example, any one of steps S1430-1 and S1430-2 described above may be omitted.

For example, above-described whether the field related to the location information of the transmitting UE or the ZONE identifier field or the preset field exists in the SCI may be pre-configured or configured for the receiving UE through a pre-defined signaling from the base station/network resource pool-specifically. For example, when HARQ feedback is not enabled, the field may be configured to not exist in the SCI.

According to an embodiment of the present disclosure, when the accuracy related to the location information of the transmitting UE does not satisfy a pre-configured threshold value, the transmitting UE may set/determine a value of the HARQ feedback request field on the SCI to a value corresponding to disable.

For example, the HARQ feedback may be specifically enabled for resource pools and/or services and/or service requirements from base stations/networks. In this case, the transmitting UE may disable the field related to the HARQ feedback request on the SCI due to an error or inaccuracy related to its location information, and the receiving UE receiving the SCI may not transmit HARQ feedback to the transmitting UE. For example, due to an error or inaccuracy related to location information, the transmitting UE may disable the field related to the HARQ feedback request on the SCI until the accuracy related to the location information satisfies a pre-configured threshold value, and the receiving UE receiving the SCI may not transmit HARQ feedback to the transmitting UE. That is, for example, when the transmitting UE determines that the accuracy related to its location information does not satisfy a pre-configured threshold value, the transmitting UE may set/determine to disable the value of the HARQ feedback request field included in the SCI transmitted to the receiving UE. For example, according to various embodiments of the present disclosure, the transmitting UE may determine that the accuracy related to its location information does not satisfy a pre-configured threshold value. In this case, for example, even if the HARQ feedback transmission of the UE is resource pool-specifically (and/or service-specific, and/or service requirement-specifically) configured or enabled by the base station/network, when the transmitting UE detects that an error has occurred on its location information or that its location information is inaccurate, the transmitting UE may set/determine the value of the HARQ feedback request field to be disabled until the accuracy related to location information satisfies a pre-configured threshold value. In this case, for example, the receiving UE receiving the SCI including the HARQ feedback request field set/determined to be disabled from the transmitting UE may not perform HARQ feedback transmission to the transmitting UE.

Additionally, according to an embodiment of the present disclosure, the above-described embodiments (e.g., the RSRP-based HARQ feedback transmission operation) may not be configured when RSRP-based HARQ feedback transmission operation when the UE is located within the base station/network coverage and/or when open-loop sidelink transmission power control based on downlink path-loss between the base station and the UE is configured and/or when open-loop sidelink transmission power control based on sidelink path loss between the transmitting terminal and the receiving terminal is configured. For example, the RSRP-based HARQ feedback transmission operation may be enabled/configured only when the UE is located outside the base station/network coverage (that is, out-of-coverage).

According to an embodiment of the present disclosure, the receiving UE may receive data from the transmitting UE. And/or, the receiving UE may determine whether to transmit HARQ feedback to the transmitting UE by using distance information (TR_DIS) and/or sidelink RSRP between the transmitting UE and the receiving UE. And/or, when the receiving UE determines to transmit HARQ feedback, the receiving UE may transmit the HARQ feedback to the transmitting UE. For example, the distance information between the transmitting UE and the receiving UE (TR_DIS) may be physical distance information. For example, the sidelink RSRP may be RSRP measured by the receiving UE based on a pre-defined measurement RS (e.g., CSI-RS, PSCCH/PSSCH DM-RS) transmitted from the transmitting UE. The sidelink RSRP (S_RSRP) may be an L1 RSRP or an L3 RSRP. At this time, for example, one or more BWPs may be configured for each of the transmitting UE and the receiving UE. For example, the transmitting UE may transmit or receive the sidelink information mentioned in the proposed method or rule through one or more configured BWPs. For example, the receiving UE may transmit or receive the sidelink information mentioned in the proposed method or rule through one or more configured BWPs.

Figure 15:
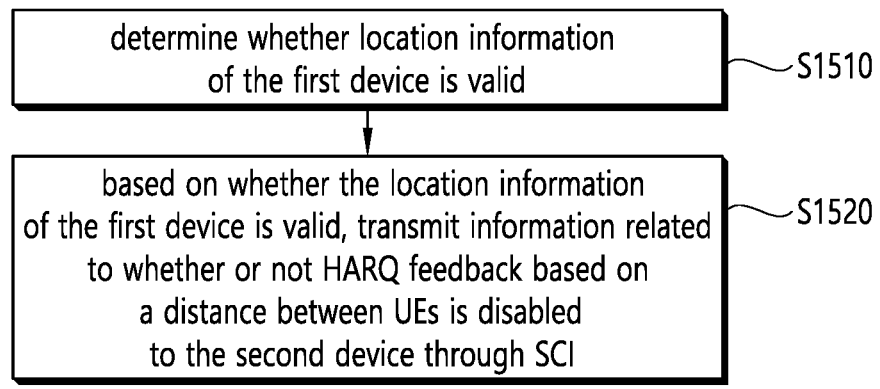
FIG. 15 shows a method for the first device 100 to transmit information related to whether location information is valid to the second device 200, in accordance with an embodiment of the present disclosure.

FIG. 15 shows a method for the first device 100 to transmit information related to whether location information is valid to the second device 200, in accordance with an embodiment of the present disclosure. The embodiment of FIG. 15 may be combined with various embodiments of the present disclosure.

Referring to FIG. 15, in step S1510, the first device 100 may determine whether location information of the first device 100 is valid. For example, whether the location information of the transmitting UE is valid may include whether the location information is available. For example, based on an accuracy related to the location information of the first device 100 is lower than a pre-configured threshold, the first device 100 may determine that the location information of the first device 100 is invalid. For example, the accuracy related to the location information of the first device 100 that is lower than the pre-configured threshold value may include at least one of a synchronization quality value of a global navigation satellite system (GNSS) related to the first device 100 that is less than a pre-configured synchronization quality threshold or the number of detected GNSSs related to the first device 100 that is less than a pre-configured number.

In step S1520, based on whether the location information of the first device 100 is valid, the first device 100 may transmit information related to whether or not HARQ feedback based on a distance between UEs is disabled to the second device 200 through sidelink control information (SCI).

For example, based on that the location information of the first device 100 is not valid, the first device 100 may transmit information notifying that the HARQ feedback based on the distance between the UEs is disabled to the second device 200 through SCI. For example, the information notifying that the HARQ feedback based on the distance between the UEs is disabled may include a value set in at least one pre-configured field on the SCI. For example, the information notifying that the HARQ feedback based on the distance between the UEs is disabled may include information representing that at least one pre-configured field does not exist on the SCI transmitted through a physical sidelink shared channel (PSSCH) related to a physical sidelink control (PSCCH). For example, the information notifying that the HARQ feedback based on the distance between the UEs is disabled may include information related to a pre-configured SCI format transmitted through a PSSCH related to a PSCCH. For example, the pre-configured SCI format may be an SCI format that does not include at least one pre-configured field. For example, the at least one pre-configured field may be at least one of a field related to the location of the first device 100, a zone ID field, or a field related to distance-based HARQ feedback. For example, the information notifying that the HARQ feedback based on the distance between the UEs is disabled may be information directly signaled by the first device 100.

For example, based on that the location information of the first device 100 is valid, the first device 100 may transmit information notifying that the HARQ feedback based on the distance between the UEs is enabled to the second device 200 through SCI. For example, based on the location information of the second device 200 being invalid, the HARQ feedback based on the distance between the UEs by the second device 200 may not be performed. For example, based on an accuracy related to the location information of the second device 200 is lower than a pre-configured threshold, the second device 200 may determine that the location information of the second device 200 is invalid. For example, the accuracy related to the location information of the second device 200 that is lower than the pre-configured threshold value may include at least one of a synchronization quality value of a global navigation satellite system (GNSS) related to the second device 200 that is less than a pre-configured synchronization quality threshold or the number of detected GNSSs related to the second device 200 that is less than a pre-configured number. For example, based on the location information of the second device 200 being invalid, the HARQ feedback may be performed for the first device 100 based on a pre-configured HARQ feedback scheme instead of HARQ feedback based on the distance between the UEs by the second device 200. For example, regardless of whether the location information of the second device 200 is valid for a transport block in which HARQ feedback is enabled, the HARQ feedback may be performed on the first device 100 by the second device 200.

The above-described embodiment may be applied to various devices to be described below. First, for example, the processor 102 of the first device 100 may determine whether location information of the first device 100 is valid. And, the processor 102 of the first device 100 may control the transceiver 106 to transmit information related to whether or not HARQ feedback based on a distance between UEs is disabled to the second device 200 through sidelink control information (SCI), based on whether the location information of the first device 100 is valid.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine whether location information of the first device is valid, and based on whether the location information of the first device is valid, transmit, to a second device, information related to whether or not hybrid automatic repeat request (HARQ) feedback based on a distance between UEs is disabled through sidelink control information (SCI).

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine whether location information of the first UE is valid, and based on whether the location information of the first UE is valid, transmit, to a second UE, information related to whether or not hybrid automatic repeat request (HARQ) feedback based on a distance between UEs is disabled through sidelink control information (SCI).

According to an embodiment of the present disclosure, a non-transitory computer-readable storage medium storing instructions may be provided. For example, the instructions, when executed, cause a first device to: determine whether location information of the first device is valid, and based on whether the location information of the first device is valid, transmit information related to whether or not hybrid automatic repeat request (HARQ) feedback based on a distance between UEs is disabled to a second device through sidelink control information (SCI).

FIG. 16 shows a method for the second device 200 to receive information related to whether location information is valid from the first device 100, in accordance with an embodiment of the present disclosure. The embodiment of FIG. 16 may be combined with various embodiments of the present disclosure.

Referring to FIG. 16, in step S1610, the second device 200 may receive information related to whether or not HARQ feedback based on a distance between UEs is disabled from the first device 100 through SCI. For example, the information related to whether or not HARQ feedback based on a distance between UEs is disabled may be determined based on whether the location information of the first device 100 is valid. For example, based on that the location information of the second device 200 is not valid, the HARQ feedback based on the distance between the UEs by the second device 200 may not be performed. For example, whether the location information of the transmitting UE is valid may include whether the location information is available.

For example, based on an accuracy related to the location information of the second device 200 is lower than a pre-configured threshold, the second device 200 may determine that the location information of the second device 200 is invalid. For example, the accuracy related to the location information of the second device 200 that is lower than the pre-configured threshold value may include at least one of a synchronization quality value of a global navigation satellite system (GNSS) related to the second device 200 that is less than a pre-configured synchronization quality threshold or the number of detected GNSSs related to the second device 200 that is less than a pre-configured number. For example, based on the location information of the second device 200 being invalid, the HARQ feedback may be performed for the first device 100 based on a pre-configured HARQ feedback scheme instead of HARQ feedback based on the distance between the UEs by the second device 200. For example, regardless of whether the location information of the second device 200 is valid for a transport block in which HARQ feedback is enabled, the HARQ feedback may be performed on the first device 100 by the second device 200.

For example, based on that the location information of the second device 200 is not valid, the second device 200 may transmit information notifying that the HARQ feedback based on the distance between the UEs is disabled to the second device 200 through SCI. For example, the information notifying that the HARQ feedback based on the distance between the UEs is disabled may include a value set in at least one pre-configured field on the SCI. For example, the information notifying that the HARQ feedback based on the distance between the UEs is disabled may include information representing that at least one pre-configured field does not exist on the SCI transmitted through a physical sidelink shared channel (PSSCH) related to a physical sidelink control (PSCCH). For example, the information notifying that the HARQ feedback based on the distance between the UEs is disabled may include information related to a pre-configured SCI format transmitted through a PSSCH related to a PSCCH. For example, the pre-configured SCI format may be an SCI format that does not include at least one pre-configured field. For example, the at least one pre-configured field may be at least one of a field related to the location of the first device 100, a zone ID field, or a field related to distance-based HARQ feedback. For example, the information notifying that the HARQ feedback based on the distance between the UEs is disabled may be information directly signaled by the first device 100.

The above-described embodiment may be applied to various devices to be described below. First, the processor 202 of the second device 200 may control the transceiver 206 to may receive information related to whether or not HARQ feedback based on a distance between UEs is disabled from the first device 100 through SCI.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive information related to whether hybrid automatic repeat request (HARQ) feedback based on a distance between UEs is disabled from a first device through sidelink control information (SCI). For example, the information related to whether the HARQ feedback based on the distance between the UEs is disabled is determined based on whether the location information of the first device is valid.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
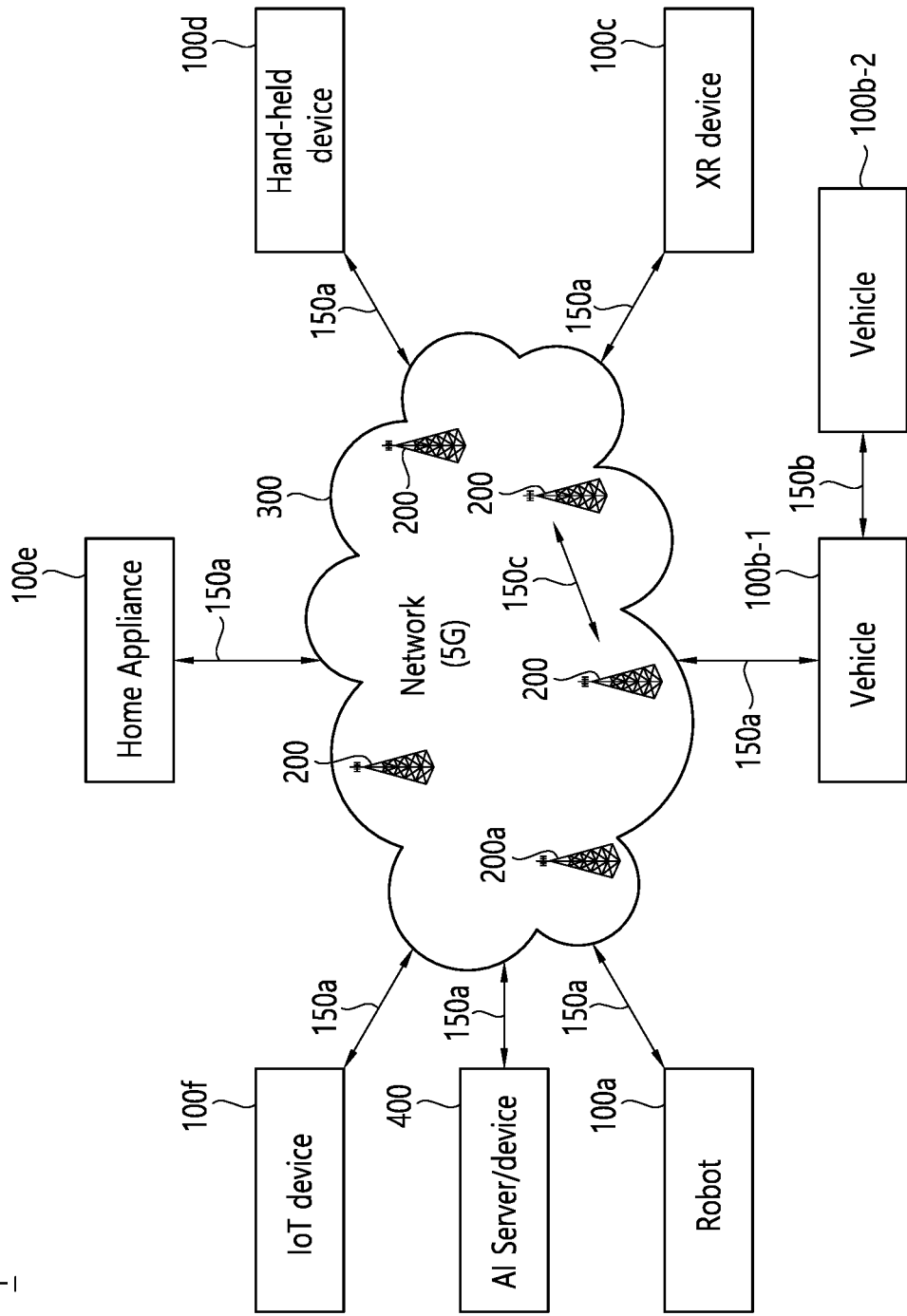
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
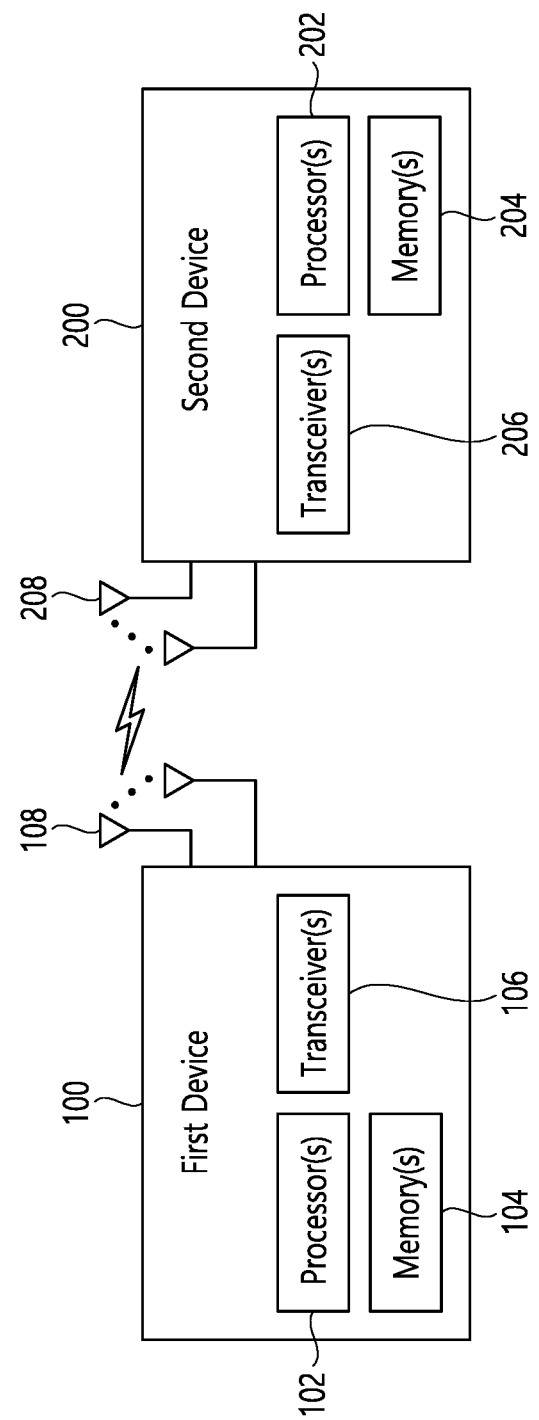
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
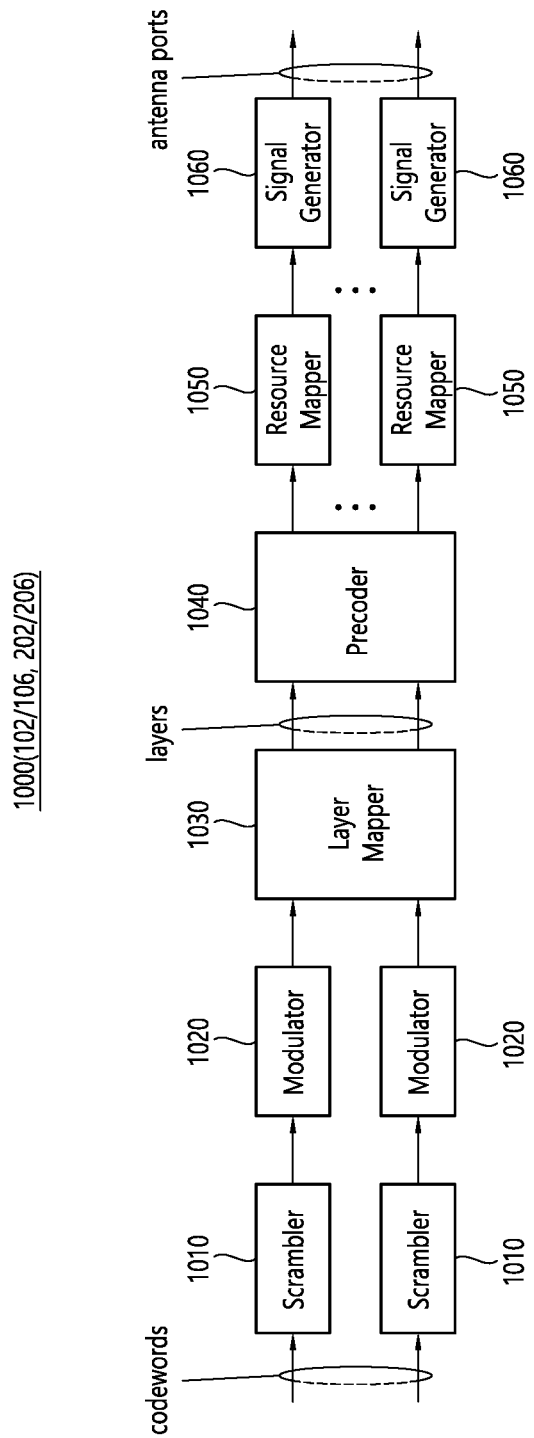
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
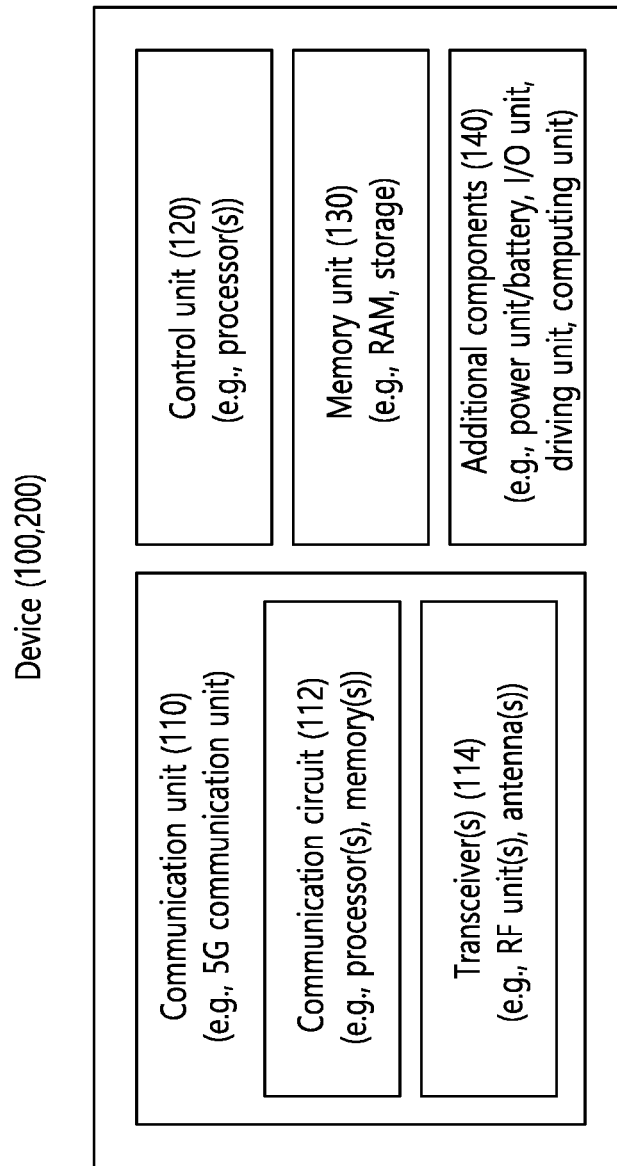
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
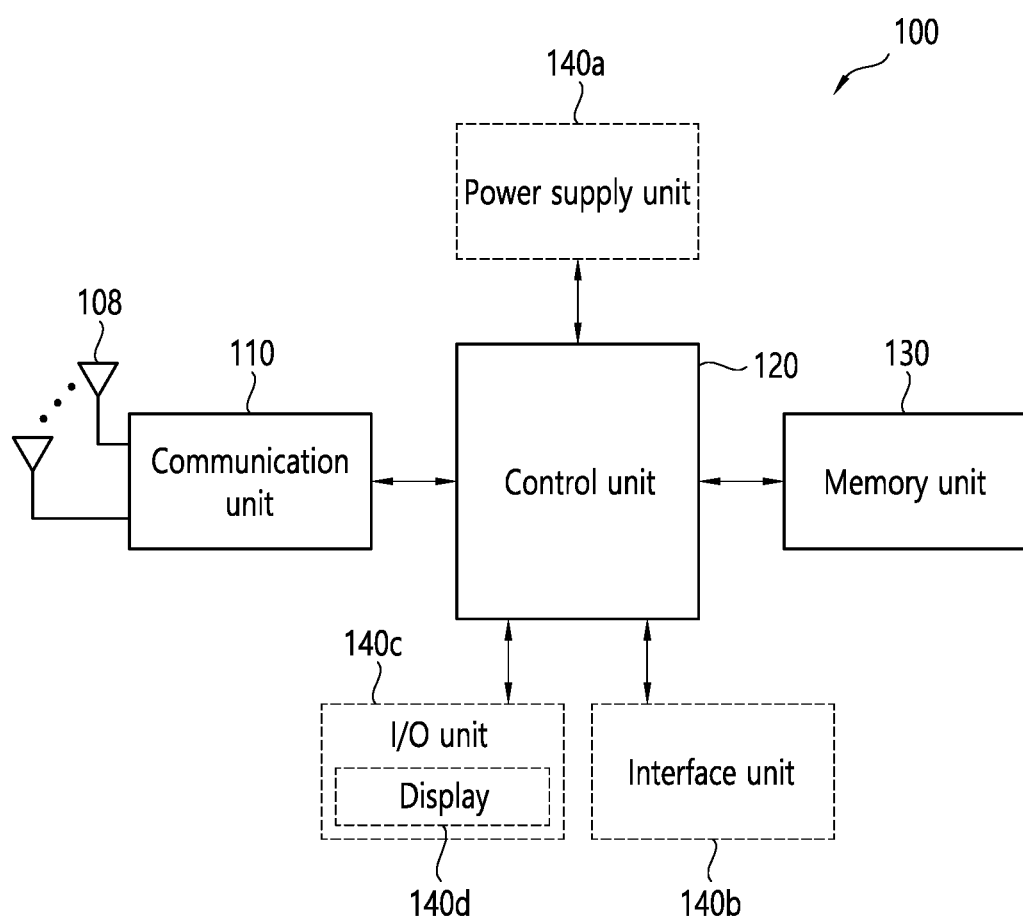
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    transmitting a first sidelink control information (SCI) including information related to a format of a second SCI to a second device through a physical sidelink control channel (PSCCH); and
    transmitting the second SCI and data to the second device through a physical sidelink shared channel (PSSCH) related to the PSCCH,
    wherein the information related to the format of the second SCI is determined based on whether location information of the first device is available,
    wherein the format of the second SCI is different based on whether the second SCI includes a field related to distance-based hybrid automatic repeat request (HARQ) feedback based on a distance between user equipments (UEs), and
    wherein, based on the location information of the first device being not available, the second SCI does not include the field related to the distance-based HARQ feedback.

2. The method of claim 1, wherein the field related to the distance-based HARQ feedback includes at least one of a field related to the location of the first device, or a field for a minimum required communication range.

3. The method of claim 1, wherein the location information of the first device being not available is determined based on an accuracy related to the location information of the first device being lower than a preset threshold.

4. The method of claim 3, wherein the accuracy related to the location information of the first device being lower than the pre-configured threshold value is determined based on a synchronization quality value of a global navigation satellite system (GNSS) related to the first device that is less than a pre-configured synchronization quality threshold.

5. The method of claim 3, wherein the accuracy related to the location information of the first device being lower than the pre-configured threshold value is determined based on the number of detected GNSSs related to the first device that is less than a pre-configured number.

6. The method of claim 1, wherein, based on the location information of the first device being available, the second SCI includes the field related to the distance-based HARQ feedback, and
    wherein the field related to the distance-based HARQ feedback includes at least one of a field related to the location of the first device, or a field for a minimum required communication range.

7. The method of claim 6, wherein, based on a location information of the second device being not available, the distance-based HARQ feedback by the second device is not performed.

8. The method of claim 7, wherein the location information of the second device being not available is determined based on an accuracy related to the location information of the second device that is lower than a pre-configured threshold value.

9. The method of claim 8, wherein HARQ feedback is performed on the first device by the second device, regardless of whether the location information of the second device is available for a transport block in which the HARQ feedback is enabled.

10. The method of claim 6, wherein, based on the location information of the second device being not available, HARQ feedback is performed by the second device for the first device based on a pre-configured HARQ feedback scheme instead of the distance-based HARQ feedback.

11. The method of claim 10, wherein the pre-configured HARQ feedback scheme includes a scheme for transmitting reference signal received power (RSRP)-based HARQ feedback.

12. A first device for performing wireless communication, the first device comprising:
    at least one transceiver;
    at least one processor; and
    at least one memory connected to the at least one processor and storing instructions that, based on being executed, cause the first device to perform operations comprising:
    transmitting a first sidelink control information (SCI) including information related to a format of a second SCI to a second device through a physical sidelink control channel (PSCCH); and
    transmitting the second SCI and data to the second device through a physical sidelink shared channel (PSSCH) related to the PSCCH,
    wherein the information related to the format of the second SCI is determined based on whether location information of the first device is available,
    wherein the format of the second SCI is different based on whether the second SCI includes a field related to distance-based hybrid automatic repeat request (HARQ) feedback, and
    wherein, based on the location information of the first device being not available, the second SCI does not include the field related to the distance-based HARQ feedback.

13. A processing device adapted to control a first device to perform wireless communication, the processing device comprising:
    at least one processor; and
    at least one memory connected to the at least one processor and storing instructions that, based on being executed, cause the at least one processor to perform operations comprising:
    transmitting a first sidelink control information (SCI) including information related to a format of a second SCI to a second device through a physical sidelink control channel (PSCCH); and
    transmitting the second SCI and data to the second device through a physical sidelink shared channel (PSSCH) related to the PSCCH, wherein the information related to the format of the second SCI is determined based on whether location information of the first device is available, wherein the format of the second SCI is different based on whether the second SCI includes a field related to distance-based hybrid automatic repeat request (HARQ) feedback, and wherein, based on the location information of the first device being not available, the second SCI does not include the field related to the distance-based HARQ feedback.

* * * * *